No. 830,374. PATENTED SEPT. 4, 1906.
R. W. SCOTT.
KNITTED FABRIC AND MODE OF MAKING SAME.
APPLICATION FILED OCT. 11, 1905.

6 SHEETS—SHEET 1.

Witnesses:
Augustus B. Copper
Titus Helrous

Inventor:
Robert W. Scott
by his Attorneys,
Howson & Howson

No. 830,374. PATENTED SEPT. 4, 1906.
R. W. SCOTT.
KNITTED FABRIC AND MODE OF MAKING SAME.
APPLICATION FILED OCT. 11, 1905.
6 SHEETS—SHEET 2.

Witnesses:—
Augustus B. Coppes
Titus Melrous

Inventor
Robert W. Scott.
by his Attorneys,

No. 830,374. PATENTED SEPT. 4, 1906.
R. W. SCOTT.
KNITTED FABRIC AND MODE OF MAKING SAME.
APPLICATION FILED OCT. 11, 1905.
6 SHEETS—SHEET 3.
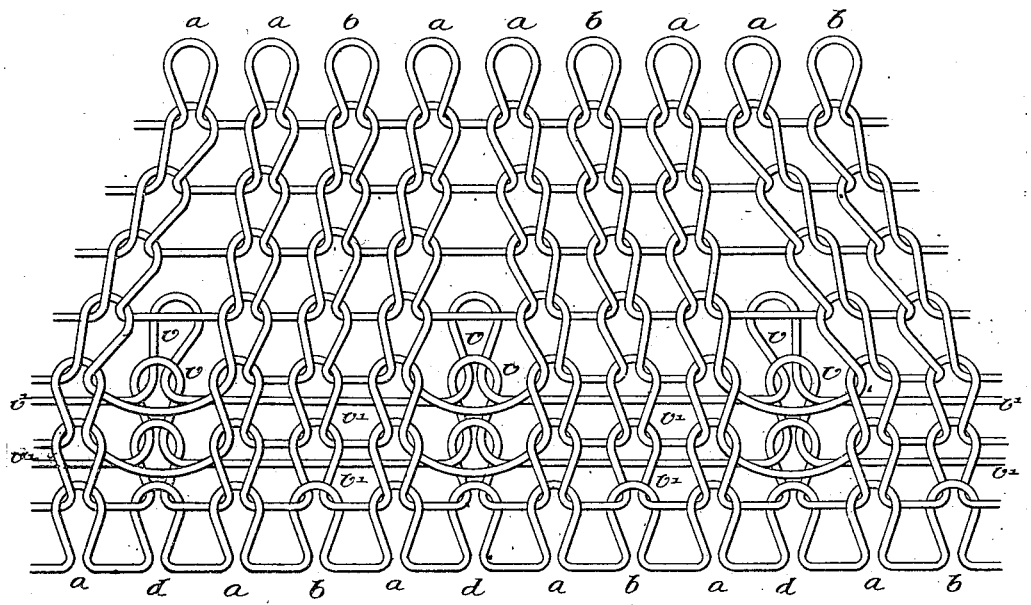
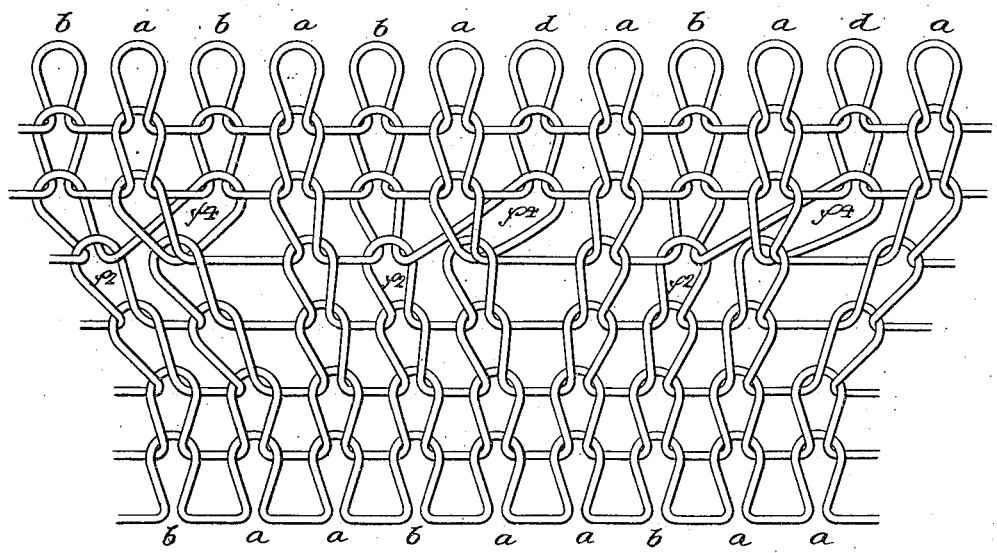
Witnesses:
Inventor
Robert W. Scott
by his Attorneys, No. 830,374. PATENTED SEPT. 4, 1906.
R. W. SCOTT.
KNITTED FABRIC AND MODE OF MAKING SAME.
APPLICATION FILED OCT. 11, 1905.

6 SHEETS—SHEET 4.

Witnesses:—
Augustus B. Coppes
Titus Krous

Inventor.
Robert W. Scott.
by his Attorneys

No. 830,374. PATENTED SEPT. 4, 1906.
R. W. SCOTT.
KNITTED FABRIC AND MODE OF MAKING SAME.
APPLICATION FILED OCT. 11, 1905.

6 SHEETS—SHEET 5.

Witnesses:
Augustus B. Coppes
Titus H. Crous

Inventor:
Robert W. Scott.
by his Attorneys

No. 830,374. PATENTED SEPT. 4, 1906.
R. W. SCOTT.
KNITTED FABRIC AND MODE OF MAKING SAME.
APPLICATION FILED OCT. 11, 1905.

6 SHEETS—SHEET 6.

Witnesses:
Augustus B. Coppes
Titus Elrod

Inventor
Robert W. Scott.
by his Attorneys

UNITED STATES PATENT OFFICE.

ROBERT W. SCOTT, OF LEEDS POINT, NEW JERSEY, ASSIGNOR OF ONE-HALF TO LOUIS N. D. WILLIAMS, OF OGONTZ, PENNSYLVANIA.

KNITTED FABRIC AND MODE OF MAKING SAME.

No. 830,374.      Specification of Letters Patent.      Patented Sept. 4, 1906.

Application filed October 11, 1905. Serial No. 282,341.

*To all whom it may concern:*

Be it known that I, ROBERT W. SCOTT, a citizen of the United States, residing at Leeds Point, Atlantic county, New Jersey, have invented certain Improvements in Knitted Fabrics and in Modes of Making Same, of which the following is a specification.

My invention relates to that class of knitted fabrics which are partly ribbed and partly plain and in which there is an excess of wales in the ribbed fabric as compared with the number of wales in the plain fabric, the object of my invention being to produce a machine-knit fabric of this character in which the change from rib-stitch to plain stitch or the reverse can be readily effected by manipulation of the needles and without stopping the machine or requiring the intervention of an attendant, the invention being therefore especially adapted for use in the manufacture of hosiery upon automatic knitting-machines.

Figure 1:
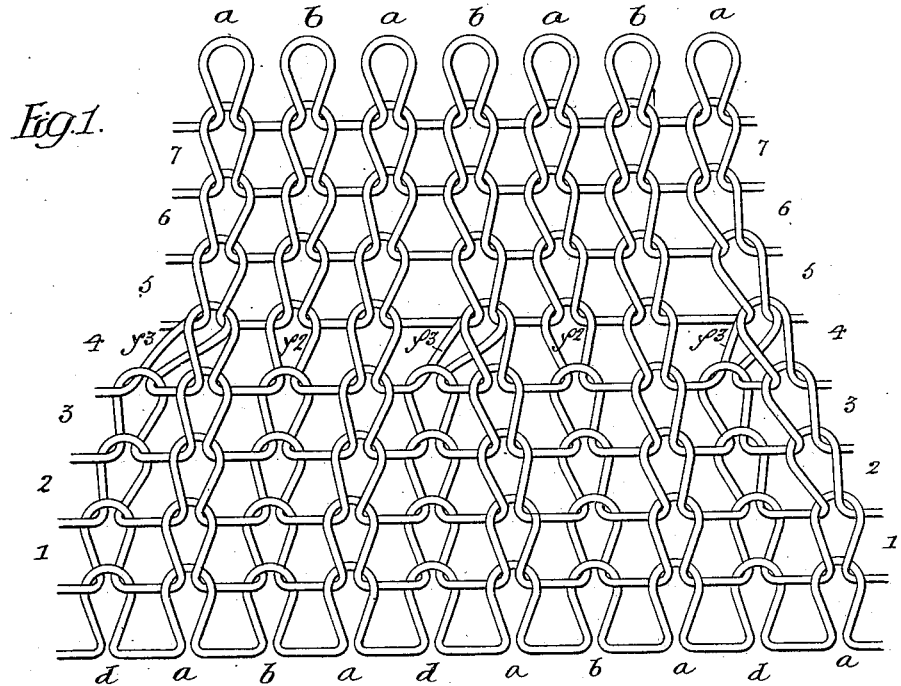
Figure 2:
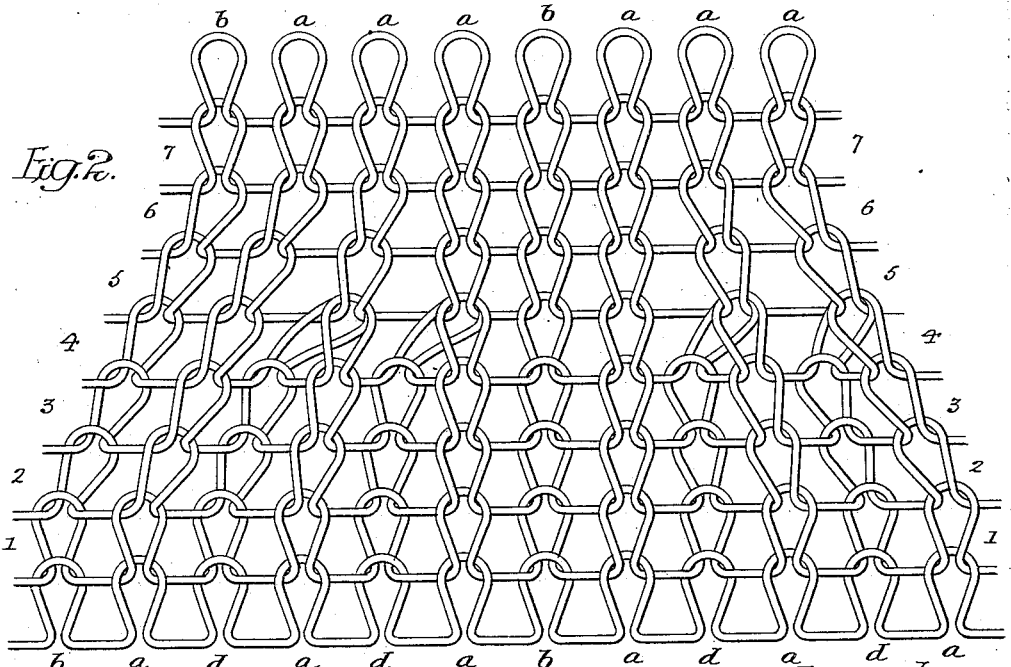
Figure 3:
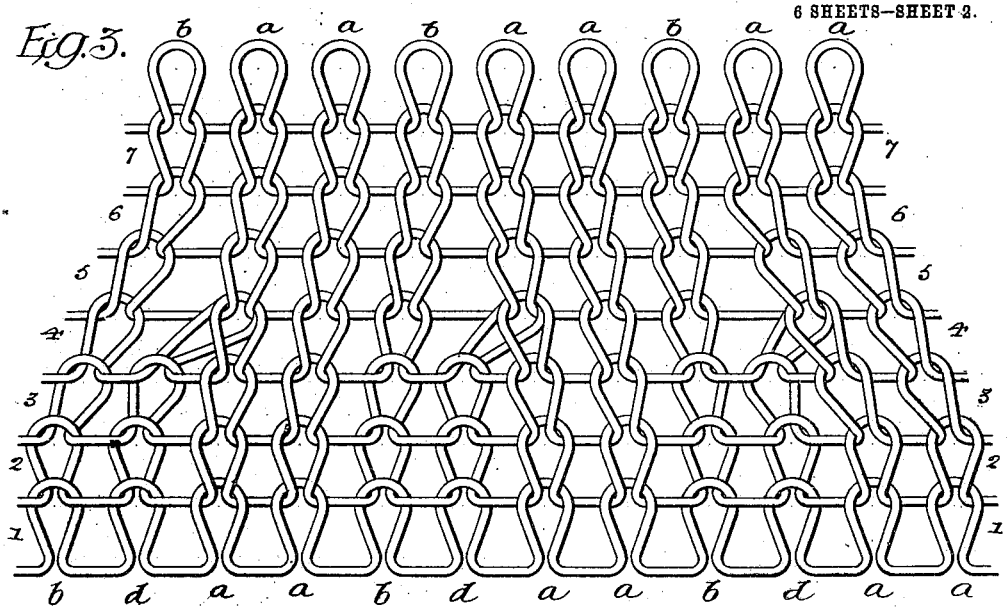
Figure 4:
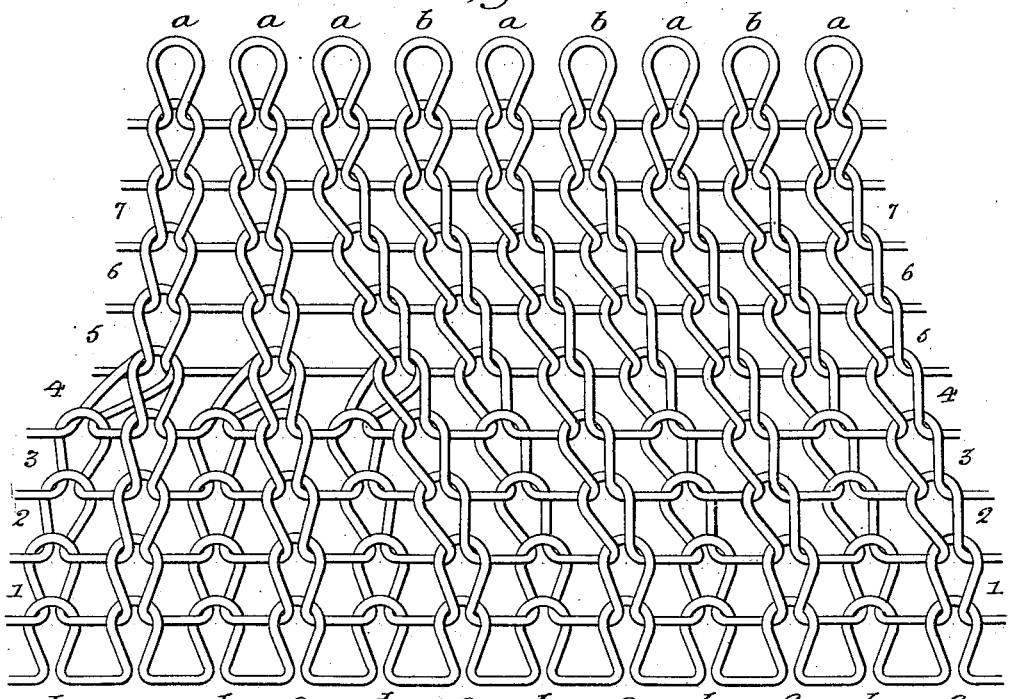
Figure 7:
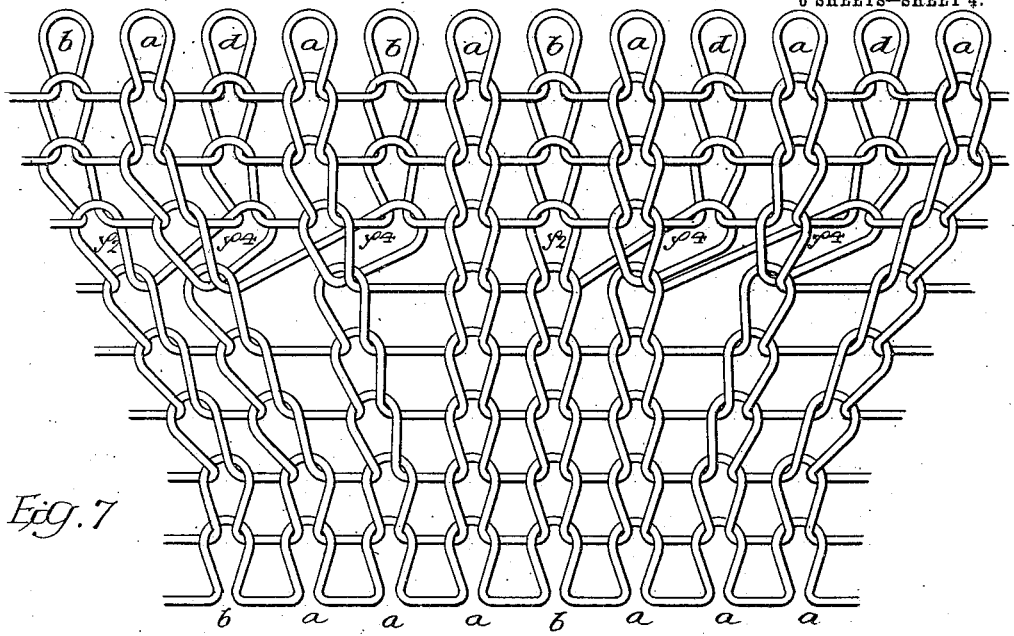
Figure 8:
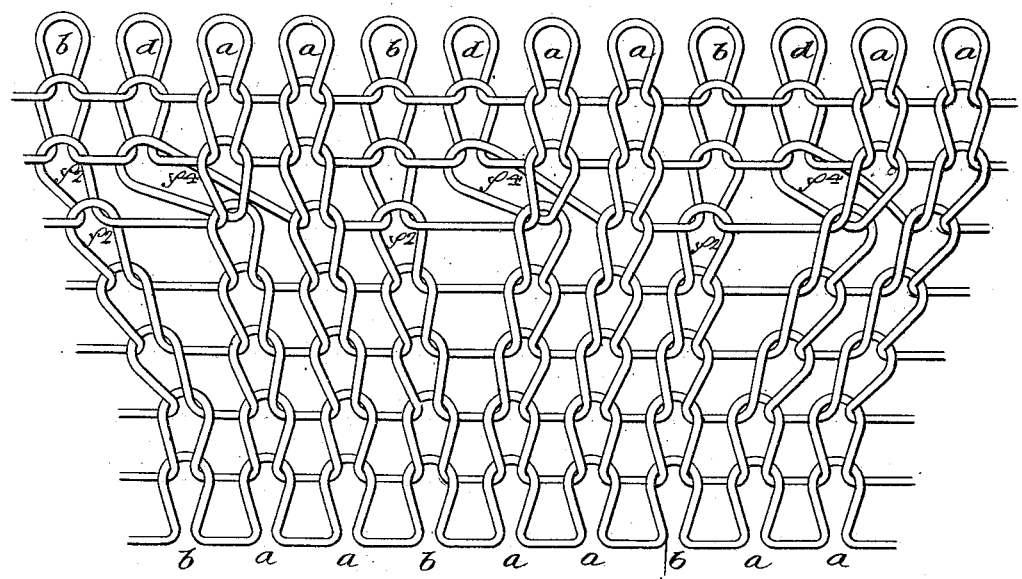
Figure 9:
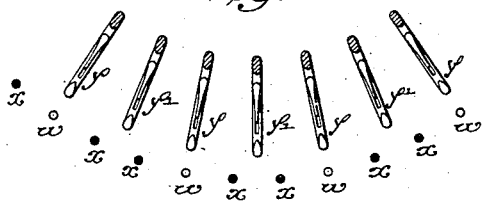
Figure 10:
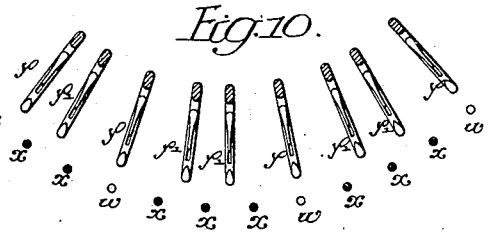
Figure 14:
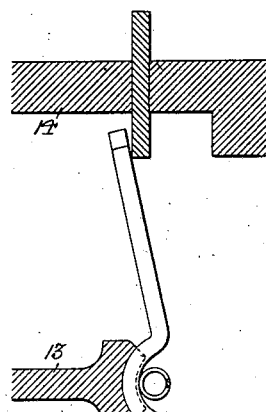
Figure 15:
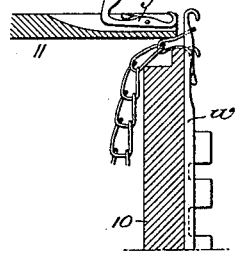
Figure 16:
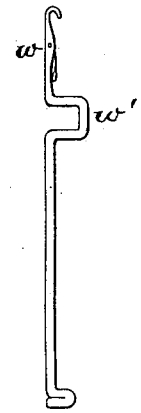
Figure 11:
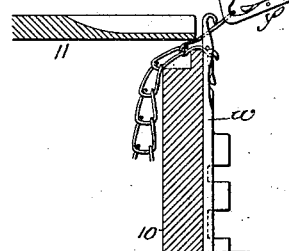
Figure 12:
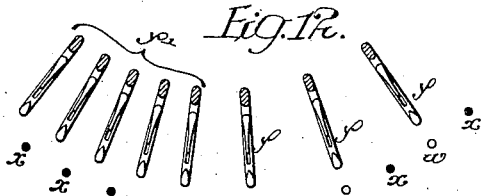
Figure 13:
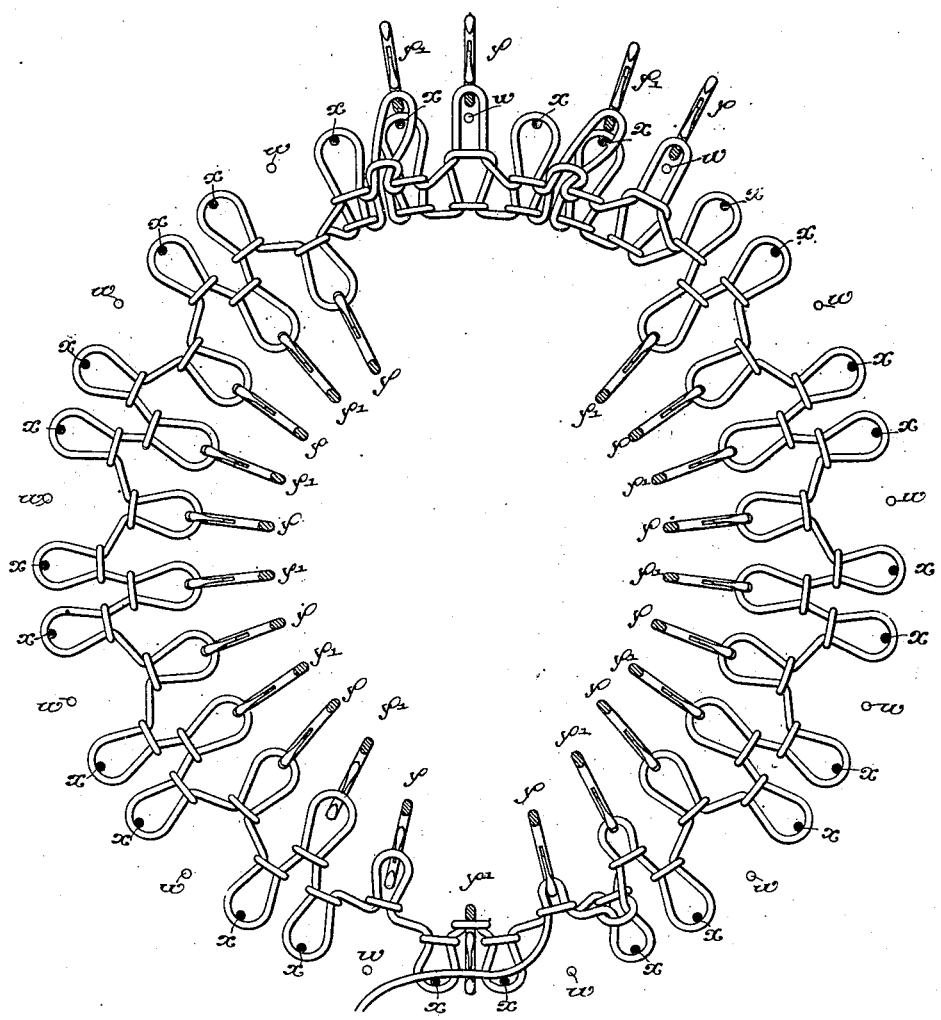

In the accompanying drawings, Figures 1, 2, 3, 4, and 5 represent, on a much exaggerated scale, various fabrics made in accordance with my invention and in which the change is from rib-knitting to plain knitting. Figs. 6, 7, and 8 are like views showing webs of the same characters as Figs. 1, 2, and 3, but in which the change is from plain knitting to rib-knitting. Fig. 9 is a diagram showing the relative arrangement of cylinder and dial needles in a machine for producing fabrics such as shown in Figs. 1 and 6. Fig. 10 is a similar view showing the relative arrangement of dial and cylinder needles in a machine for producing fabrics such as shown in Figs. 2 and 7. Fig. 11 is a similar view showing the arrangement of cylinder and dial needles in a machine for producing fabrics such as shown in Figs. 3 and 8. Fig. 12 is a similar view showing the relative arrangement of cylinder and dial needles in a machine for producing fabrics such as shown in Fig. 4. Fig. 13 is a view showing a complete set of cylinder and dial needles, some of the dial-needles having been moved into position for transferring their stitches to the cylinder-needles. Fig. 14 is a vertical sectional view of sufficient of a knitting-machine to illustrate the method of transfer, the dial-needle being projected so as to bring its stitch into position for being engaged by the cylinder-needle, the latter being shown in engagement with the stitch. Fig. 15 is a similar view to Fig. 14, but showing the dial-needle retracted and its stitch cast onto the cylinder-needle; and Fig. 16 is a view of a special cylinder-needle which is sometimes employed.

In Figs. 1, 2, 3, and 4 of the drawings, $a$ represents plain-stitch wales which extend throughout both the ribbed and plain webs, $b$ represents composite wales having rib-stitches in the ribbed web and plain stitches in the plain web, and $d$ represents rib-stitch wales which at the point of change of the webs are discontinued and interknitted with or merged into adjoining plain-stitch wales.

"Plain-stitch wales" may be described as those having all of their stitches drawn to the face of the web, "rib-stitch wales" as those having all of their stitches drawn to the back of the web, and "composite wales" as those having their stitches drawn to the back of the web in the ribbed portion and to the face of the web in the plain portion, there being a reversal in the direction of the stitches in these wales at the point of change from ribbed to plain web.

In producing the fabric shown in Fig. 1 I use a machine having the dial and cylinder needles disposed as shown in Fig. 9, in which $x$ represents cylinder-needles, which are always in action for the production of continuous plain-stitch wales. $w$ represents cylinder-needles, which are not in action during the production of ribbed web, but receive stitches from certain of the dial-needles in effecting the change from ribbed web to plain web. $y$ represents those dial-needles which transfer their stitches to the cylinder-needles $w$, and $y'$ represents dial-needles upon which are formed the wales of the ribbed web, which are in excess of those in the plain web, these dial-needles in changing from ribbed web to plain web being put out of action after having first transferred their stitches to adjoining cylinder-needles, on which said stitches are doubled with the stitches already carried by said cylinder-needles.

In Fig. 1 of the drawings, 1, 2, and 3 represent courses of ribbed web, 5, 6, and 7 represent courses of plain web, and 4 represents the change course, $y^2$ representing the stitches which are transferred from the dial-needles $y$ to the formerly inactive cylinder-needles $w$, and $y^3$ representing the stitches which have been transferred from the dial-needles $y'$ to the adjoining cylinder-needles and doubled upon the latter with the stitches already carried thereby.

The fabric shown in Fig. 1 is a "one-and-one" rib-web—that is to say, one in which each cylinder or plain-stitch wale alternates with a dial or rib stitch wale—and in effecting the change in this fabric one-half of the dial-needles have transferred their stitches "straight" or to previously inactive and naked cylinder-needles, the alternate dial-needles "doubling" or transferring their stitches to already occupied cylinder-needles. This is what is termed a "thirty-three and one-third per cent. doubling," there being thirty-three and one-third per cent. more wales in the ribbed web than in the plain web.

The fabric shown in Fig. 2 is a one-and-one rib-web, in which what is termed a "fifty-per-cent. doubling" has been effected, there being fifty per cent. more wales in the ribbed web than in the plain web. This is accomplished by causing a straight transfer from one-third of the dial-needles and a doubling transfer from the remaining two-thirds of said needles, the disposition of the needles in the cylinder and dial for producing this web being shown in Fig. 10, in which $y$ represents straight transfer dial-needles and $y'$ doubling transfer-needles.

In Fig. 3 I have shown a "two-and-two" ribbed web, in which change from rib-knitting to plain knitting has been effected in accordance with my invention, the disposition of the cylinder and dial needles in a machine for producing this class of web being shown in Fig. 11.

In each of the fabrics shown in Figs. 1, 2, and 3 there are a series of composite wales $b$ and a corresponding series of discontinued wales $d$, individual members of one series alternating with individual members of the other series, but this disposition of the respective wales is not essential to the broader embodiment of my invention. For instance, in Fig. 4 I have shown a fabric in which all of the composite wales $b$ are grouped in one portion of the web and all of the discontinued wales $d$ are grouped in another portion of the web, the disposition of the cylinder and dial needles in a machine for producing a fabric of this character being shown in Fig. 12.

The term "individual members" does not necessarily mean single wales, but applies as well to pairs or groups of wales.

My invention may even be embodied in a fabric in which the discontinued rib-wales are not merged into or interknitted with adjoining standing wales, but are dropped from the dial-needles $y'$ when they are put out of action, suitable means being adopted for preventing the running back of these dropped stitches—as for instance, by forming a plurality of terminal stitches $v$ in the discontinued wales, which terminal stitches are connected by sinker-wales $v'$ and are relieved from strain exerted upon the adjoining standing wales. (See Fig. 5.)

My invention can also be embodied in webs in which the change is from plain knitting to rib-knitting instead of the reverse, as before described. Thus Fig. 6 illustrates a web in which after producing plain web upon all of the cylinder-needles $x$ and $w$ the stitches are transferred from the cylinder-needles $w$ to the dial-needles $y$, and the dial-needles $y'$ are introduced so as to draw loops of the knitting-yarn in the change course, $y^2$ representing the transferred stitches and $y^4$ the introduced loops starting the rib-wales $d$.

In order to prevent the formation of eyelet-holes, such as would otherwise be caused by drawing loops upon the naked dial-needles $y'$ if the latter were introduced in their regular position between the cylinder-needles $x$ $x$, I shog or move laterally said dial-needles $y'$ before projecting them between the cylinder-needles to receive the yarn. Consequently each dial-needle $y'$ is projected between a cylinder-needle $x$ and a cylinder-needle $w$ and after receiving its yarn is then made to resume its normal position between the cylinder-needles $x$ $x$, the initial loop $y^4$ of the wale $d$ being therefore drawn across the adjoining standing wale $a$, as shown in Fig. 6. This produces a web having thirty-three and one-third per cent. more wales in the ribbed portion than in the plain portion, as in Fig. 1. In Fig. 7 I have shown a web in which the change is made from plain web to ribbed web in the manner before described, but upon a machine of the character shown in Fig. 10, so as to produce fifty per cent. more wales in the ribbed web than in the plain web.

In Fig. 8 I have shown a web in which the change is from plain web to two-and-two ribbed web, such change being effected upon a machine of the character shown in Fig. 11.

In carrying out my invention various forms of machine may be employed, but in Figs. 14 and 15 I have shown sufficient of the elements of one form of machine which has proven effective in practice to impart a proper understanding of the method of manipulating the needles to effect the transfer of stitches from one to another. In these views, 10 represents part of a needle-cylinder and 11 part of a dial on the inside of the cylinder. The dial-needles $y$ $y'$ are carried b the lower ends of jacks 12, pivotally mounte upon a fixed ring 13 and having their uppe ends acted upon by cams carried by a cam-plate 14, this plate having two sets of cams, one for acting upon the jacks so as to cause operation of the dial-needles for ordinary knitting and another set for causing abnormal projection of the dial-needles, so as to carry them outwardly beyond the cylinder-needles. This has the effect of drawing or stretching the web, so as to dispose stitches of the same over the cylinder, as shown in Fig. 14, so that cylinder-needles may be projected and caused to enter said stitches, as also shown in said Fig. 14, the dial-needles $y$ preserving their normal position while being thus projected, so that their stitches will be disposed above cylinder-needles $w$, but the dial-needles $y'$ being shogged or moved laterally from their normal position, so that their stitches will be disposed above appropriate cylinder-needles $x$.

The projection of the dial-needles may be such as either to bring the stitches upon them or precedently-formed stitches above the cylinder-needles which are to engage the same.

When the cylinder-needles are projected, so as to enter the stitches upon the dial-needles, either of the said needles may be moved laterally to the extent necessary to cause engagement of the cylinder-needles with the dial-stitches, and the dial-needles can then be withdrawn, so as to cast their stitches onto the cylinder-needles preparatory to the formation of plain web upon the latter. When the cylinder-needles engage stitches other than those upon the dial-needles, the lateral movement referred to will not be necessary. In changing from plain web to ribbed web cylinder-needles $w$ may be abnormally projected, so as to transfer their stitches to the dial-needles $y$, in which case said cylinder-needles $w$ will be provided with projections or butts—such, for instance, as shown at $w'$, Fig. 16, for stretching the cylinder-stitches and permitting the dial-needles to enter and engage the same.

In any of the machines used for producing my improved fabric the cylinder is by preference cut or grooved, so as to present a uniform gage whereby a corresponding uniform gage of plain web is insured, and although there may be a lack of uniformity in the cutting of the dial substantial uniformity of gage in the ribbed fabric may be attained by so manipulating those needles of the dial which occupy the closer relation to the cylinder-needles as to provide an excess of yarn tending to produce a substantially equidistant disposal of the wales in the ribbed portion of the web. For instance, these closely-disposed dial-needles may at the time that the stitches are being formed upon them be raised to a greater extent above the cylinder-needles than are the other dial-needles, or the closely-disposed dial-needles may constitute the primary or stitch-drawing needles and may be retracted to a greater extent than the other dial-needles, or the excess draft may be caused by the cylinder-needles when these are the primary needles.

The spreading of the wales of stitches in the various views of the drawings is not apparent in the finished fabric, as the greater contractile power of the ribbed web causes its surface wales to lie as closely together as those of the plain web.

Various dispositions of the needles of the dial and cylinder may be resorted to in order to produce any desired character of ribbed web, but the following formula may be relied upon as a guide for determining the relative number of standing wale-needles, transfer-needles, and doubling-needles in the machine. Let A equal the total number of cylinder-needles, B equal the total number of dial-needles, C equal the total number of transfer-needles, D equal the total number of doubling-needles, then A minus C equals B and B minus C equals D. The rule for doubling may also be expressed as follows: If the number of transfer-needles in the cylinder is one in three, a thirty-three and one-third per cent. doubling will result; if the number of transfer-needles in the cylinder is one in four, a fifty per cent. doubling will be effected; if it is one in five, there will be a sixty per cent. doubling, and so on.

My improved fabric can be knitted without arresting the operation of the machine and by the use of a continuous thread, it being understood that the knitting-cams and the transfer-cams are disposed at points so remote from each other that the knitting operation can be going forward upon certain of the needles of the machine while stitches are being transferred from and to other needles of the machine at a point more or less remote from the knitting-point. Thus in Fig. 13 X represents the knitting-point and Y the transfer and doubling point.

The use of a continuous thread common to both the ribbed and plain webs distinguishes my improved fabric from that in which the ribbed web is made upon one machine and then transferred to the needles of another machine upon which the plain web is produced, and certain of the fabrics are further distinguished from the latter in having the transferred wales and doubled wales alternating with each other throughout the extent of the fabric, whereas in the ordinary method of "running on" a ribbed fabric upon the needles of a plain-web machine the stitches of the ribbed web are transferred consecutively to the needles of the plain-web machine throughout a certain extent of the latter, the excess stitches being crowded upon the remaining needles. For instance, in transferring a ribbed web having one hundred and eighty wales to a plain-web machine having one hundred and twenty needles eighty consecutive wales of the ribbed web may be transferred to eighty successive needles of the plain-web machine, and the remaining eighty wales of said ribbed web may be crowded upon the remaining forty needles of said plain-web machine, there being no designed alternation of straight transfers and doublings, as in my improved fabric.

My invention is not limited to a web composed of a single continuous yarn, since it is manifest that different yarns may be employed in either web when it is desired to produce a striped or mixed effect therein by the use of yarns of different colors supplied to the needles by different yarn-feeds, but even in that case there will be courses of stitches knitted with a continuous yarn common to both webs, although the term "continuous" does not necessarily imply unbroken continuity, as yarns of different color or character may be used in different portions of the web, so long as the meeting ends of said yarns overlap or provide for a continuous feed of yarn to needles of one and the same machine.

It is manifest also that the transferred and doubled stitches may be in different courses of the fabric—that is to say, after the straight transfer of the stitches of certain of the rib-wales one or more courses may be knitted before the doubling transfer—and the reverse of this proposition is equally true.

Having thus described my invention, I claim and desire to secure by Letters Patent—

1. A machine-knit fabric, partly ribbed and partly plain, having a continuous yarn common to both webs, the ribbed web having wales in excess of those in the plain web, and some of the wales of one web being reversed and continued as wales of the other web.

2. A machine-knit fabric, partly ribbed and partly plain, having a continuous yarn common to both webs, the ribbed web having wales in excess of those in the plain web, some of the wales of one web being reversed and continued as wales of the other web, and the excess wales being discontinued at the point where the character of the fabric changes.

3. A machine-knit fabric, partly ribbed and partly plain, having a continuous yarn common to both webs, the ribbed web having wales in excess of those in the plain web, some of the wales of one web being reversed and continued as wales of the other web, and the excess wales being interknitted with standing wales at the point where the character of the fabric changes.

4. A machine-knit fabric, partly ribbed and partly plain, having a continuous yarn common to both webs, and having a plain web of uniform gage and a ribbed web having wales in excess of those in the plain web, some of the wales of one web being reversed and continued as wales of the other web.

5. A machine-knit fabric, partly ribbed and partly plain, having a continuous yarn common to both webs, and having a plain web of uniform gage and a ribbed web having wales in excess of those in the plain web, some of the wales of one web being reversed and continued as wales of the other web, and the excess wales being discontinued at the point where the character of the fabric changes.

6. A machine-knit fabric, partly ribbed and partly plain, having a continuous yarn common to both webs, and having a plain web of uniform gage and a ribbed web having wales in excess of those in the plain web, some of the wales of one web being reversed and continued as wales of the other web, and the excess wales being interknitted with standing wales at the point where the character of the fabric changes.

7. A machine-knit fabric, partly ribbed and partly plain, having a continuous yarn common to both webs, both the plain web and the ribbed web being of uniform gage, the ribbed web having wales in excess of those in the plain web, and some of the wales of one web being reversed and continued as wales of the other web.

8. A machine-knit fabric, partly ribbed and partly plain, having a continuous yarn common to both webs, both the plain web and the ribbed web being of uniform gage, the ribbed web having wales in excess of those in the plain web, some of the wales of one web being reversed and continued as wales of the other web, and the excess wales being discontinued at the point where the character of the fabric changes.

9. A machine-knit fabric, partly ribbed and partly plain, having a continuous yarn common to both webs, both the plain web and the ribbed web being of uniform gage, the ribbed web having wales in excess of those in the plain web, some of the wales of one web being reversed and continued as wales of the other web, and the excess wales being interknitted with standing wales at the point where the character of the fabric changes.

10. A machine-knit fabric, partly ribbed and partly plain, having in the ribbed web wales in excess of those in the plain web, some of the wales of one web being reversed and continued as wales of the other web, and the excess wales being discontinued at the point where the character of the webs changes, the individual members of a series of such discontinued wales alternating with the individual members of a corresponding series of reversed and continued wales.

11. The mode herein described of changing from one character of web to another in a fabric which is partly plain and partly ribbed, said mode consisting in first knitting ribbed fabric upon two sets of needles, and then transferring some of the rib-stitches to naked needles of the other set, and other rib-stitches to needles of said set which have already been in action and have stitches upon them.

12. As an improvement in that method of changing from one character of web to another in a machine-knit fabric, partly plain and partly ribbed, which consists in transferring wales of one face of the web to wales of the other face of the web, the mode herein described of effecting such transfer, said mode consisting in stretching in the direction of their length only the stitches which are to be transferred, and projecting the receiving-needles into said stitches while they are thus stretched, and then casting said stitches from the needles upon which they were formed.

13. As an improvement in that method of changing from one character of web to another in a machine-knit fabric which is partly ribbed and partly plain, which consists in transferring stitches of wales of one face of the web to wales of the other face of the web, the mode herein described of effecting such transfer, which mode consists in stretching in the direction of their length and laterally shogging those stitches which are to be transferred and projecting the receiving-needles into such stitches while they are thus stretched and shogged, and then casting said stitches from the needles upon which they were formed.

In testimony whereof I have signed my name to this specification in the presence of two subscribing witnesses.

ROBERT W. SCOTT.

Witnesses:
  WALTER CHISM,
  JOS. H. KLEIN.